Dec. 18, 1951      A. G. BADE      2,578,914
VARIABLE SPEED TRANSMISSION
Filed May 28, 1945      2 SHEETS—SHEET 2
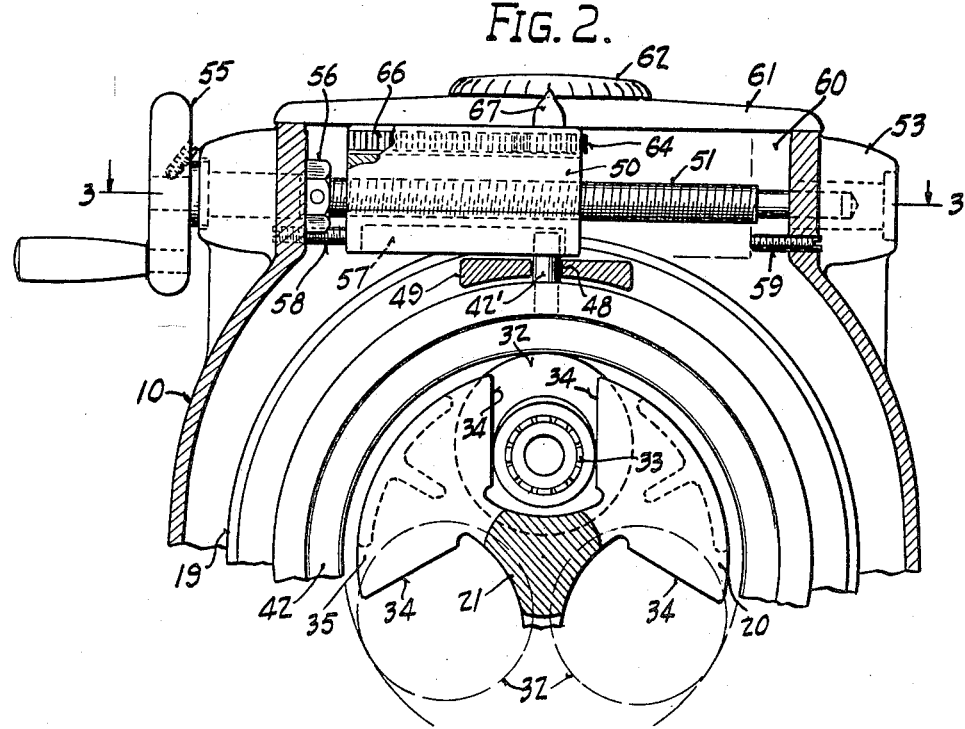
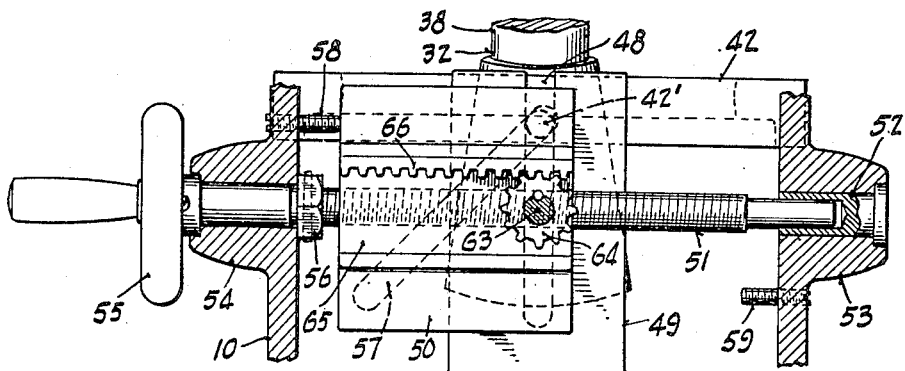
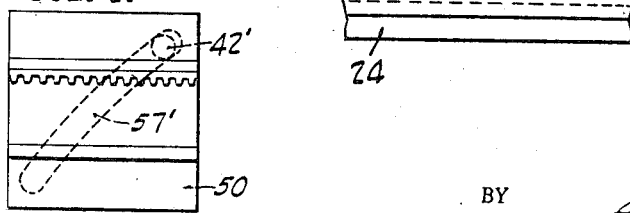
Alfred G. Bade.
INVENTOR.
BY
ATTORNEY.

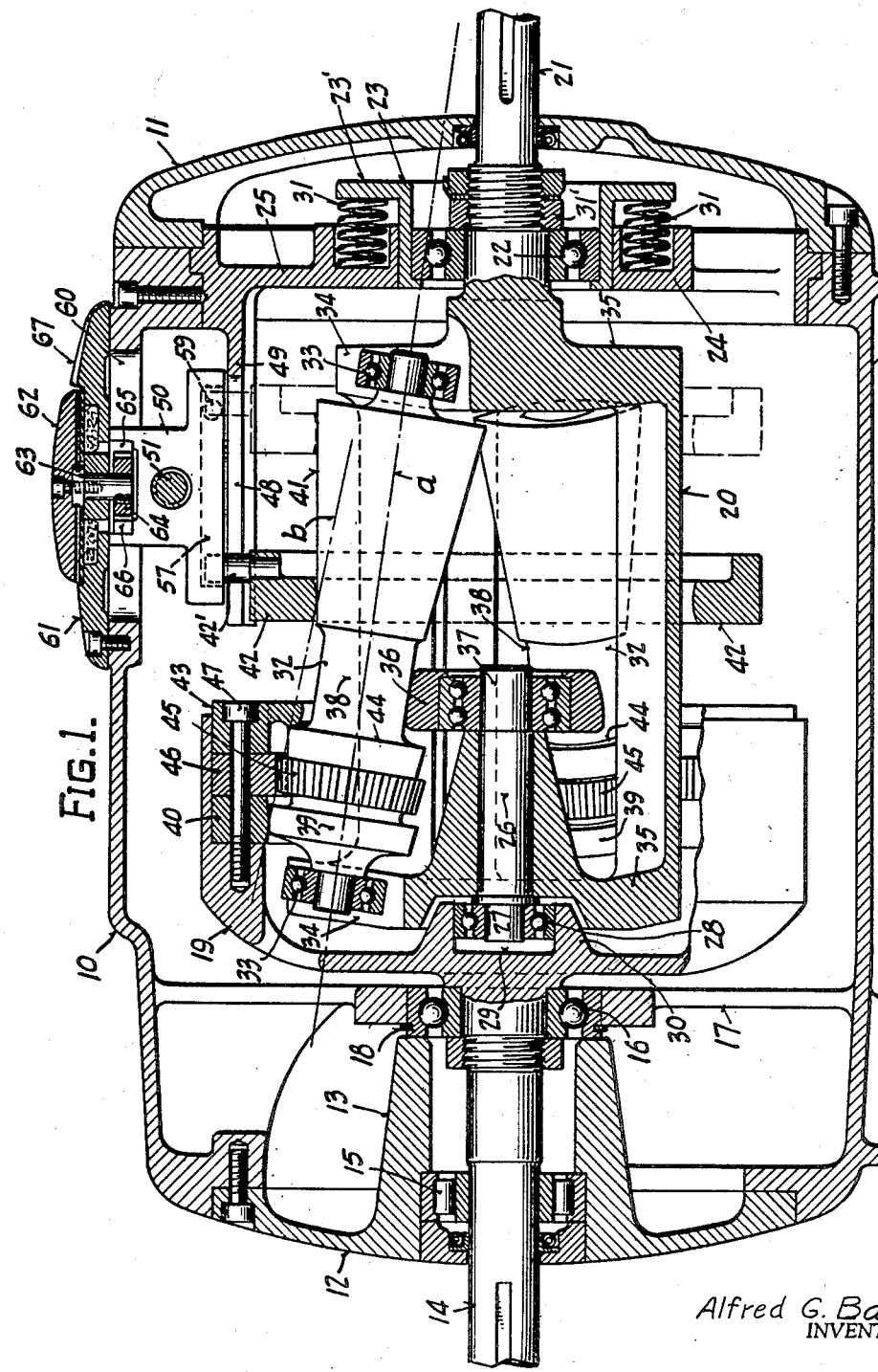

Patented Dec. 18, 1951

2,578,914

UNITED STATES PATENT OFFICE 2,578,914

VARIABLE-SPEED TRANSMISSION

Alfred G. Bade, Milwaukee, Wis., assignor to The Falk Corporation, Milwaukee, Wis., a corporation of Wisconsin Application May 28, 1945, Serial No. 596,353

7 Claims. (Cl. 74—796)

1

This invention relates to variable speed transmissions of the planet roller type.

This application is a continuation in part of my copending application Serial No. 471,116, filed January 2, 1943, which has been abandoned in favor of the present application.

An improved transmission of this type is disclosed in my Patent No. 2,328,536, in which the planet rollers are frictionally engaged with a driven ring and a non-rotating control ring, the latter being adjustable to regulate the speed ratio of the transmission.

In the transmission therein shown contact pressures between the rollers and both rings are relied upon to develop sufficient traction to sustain the torque reactions therebetween, the rollers being urged against both rings and the contact pressures between them and one ring being dependent upon and a function of the contact pressures between them and the other ring. Such an arrangement has many advantages but, as therein shown, if the contact pressures against one ring are of sufficient magnitude to sustain the torque reactions between the rollers and that ring, the contact pressures against the other ring may be either too low to sustain the torque reactions thereon or unnecessarily high. These conditions unduly limit the capacity of the transmission.

One object of the present invention is to provide an improved variable speed transmission of the character mentioned which shall be free of the objections above noted.

Other more specific objects and advantages will appear, expressed or implied, from the following description of an illustration embodiment of the present invention.

In the accompanying drawings:

Figure 1 is a longitudinal sectional view of a variable speed transmission constructed in accordance with the present invention.

Fig. 2 is a fragmentary transverse section.

Fig. 3 is a sectional view taken substantially along the line 3—3 of Fig. 2.

Fig. 4 is a plan view of the speed regulating block shown in Fig. 3 equipped with a modified form of cam slot.

The variable speed transmission selected for illustration is shown enclosed in an appropriate housing 10 closed at one end by a head 11, bolted or otherwise removably attached thereto, and at the other end by a removable disk 12 having an inwardly projecting hollow hub 13 formed integral therewith.

The hub 13 provides partial support for a

2 driven shaft 14 journalled in a suitable bearing 15 seated in the hub. The driven shaft 14 is additionally supported by a bearing 16 carried by a spider 17 formed in the housing. The driven shaft 14 is fixed against lengthwise displacement by the bearing 16 which in this instance is positioned by a suitable retainer ring 18 seated thereon and engaging the spider 17 and also by the adjacent abutting end of the hub 13. A drum 19, formed integral with the driven shaft 14 for rotation therewith, constitutes a rotary carrier for parts hereinafter described.

The transmission shown also includes a rotary cage 20 supported at one end by an integral shaft 21, constituting a drive shaft, which is journalled in a bearing 22 seated in an axially movable bushing 23 closely fitted within the central hub 24 of a disk 25 removably fixed within one end of the housing 10. The opposite end of the cage 20 is supported by a stub shaft 26 having an outer end 27 journalled in a bearing 28 slidably seated in a cavity 29 formed in the hub 30 of the drum 19.

The cage 20 and its drive shaft 21 are thus mounted for rotation about an axis coincident with the axis of the driven shaft 14 and also lengthwise movable along said axis. For a purpose which will later appear the cage 20 is urged lengthwise in one direction by appropriate means, which in this instance includes a plurality of compression springs 31 interposed between the disk 25 and a flange 23' on the bushing 23.

A plurality of planet rollers 32, preferably three in number, are arranged to rotate with the cage 20 and also to rotate about their respective axes $a$ which are similarly inclined in such direction as to intersect the axis of rotation of the cage at a single or common point. In this instance each roller 32 is constrained to rotate with the cage 20 by means of anti-friction bearings 33 at the opposite ends of each roller, each bearing being closely guided by and between the opposed side walls 34 of a radial slot formed in an end head 35 of the cage 20, each roller being thereby retained in such position that its axis $a$ lies within a radial plane of the cage.

Each roller 32 is fulcrumed intermediate its ends by appropriate means such as a ring 36 rotatably mounted upon the inner end 37 of the stub shaft 26 and in rolling contact with an intermediate cylindrical section 38 of the roller. Each roller is provided adjacent one end with a tapered section 39 in rolling engagement with a ring 40 and adjacent its other end with an axially extended tapered section 41 in rolling engagement with a ring 42, the angle of the taper of each of sections 39 and 41 being equal to the angle of inclination of the roller axis and in such direction that the outer extremities of each are parallel to the axis of rotation of the cage 20.

The rings 40 and 42 encircle the group of rollers and the latter are preferably so proportioned that their centers of gravity are disposed between the points of contact thereof with the rings 40 and 42, so that as they rotate with the cage 20 they are centrifugally urged against both of said rings. The rings 40 and 42 thus coact with the tapered sections 39 and 41, respectively, to determine the inclination of the rollers relative to the axis of rotation of the cage.

The fulcrum ring 36 provides additional means for forcing the several rollers against the rings 40 and 42. For that purpose the ring 36 is constrained to move axially with the cage 20 so as to induce a wedge-like action against the intermediate sections 38 of the inclined rollers in a manner to force the latter outwardly as the cage is urged toward the right (Fig. 1) by the springs 31 hereinabove mentioned. The thrust, thus induced by the springs 31 may be regulated by adjustment of the nut 31' along the shaft 21, the nut 31' serving to position the bearing 22 and bushing 23 relative to the stationary disk 25.

In the transmission shown the reaction between the ring 36 and rollers 32 produces a thrust urging the rollers lengthwise toward the right (Fig. 1) but the latter are held against lengthwise displacement by appropriate means such as a thrust sustaining ring 43 which bears against an annular stop shoulder 44 formed on each roller. The lengthwise positions of the rollers are thus accurately fixed by the thrust sustaining ring 43.

Each roller 32 carries a pinion 45 which meshes with a ring gear 46 carried by the rotary carrier or drum 19 through which each roller is connected in positive driving relation with the drum. The ring gear 46 is shown seated within the drum 19 between the rings 40 and 43, the rings and gear being removably fixed to the drum by appropriate means such as a plurality of screws one of which is shown at 47 extending through the rings.

The rings 36, 40 and 42 are preferably slightly crowned so as to reduce to a minimum the areas of contact between them and the rollers 32. That face of the ring 43 which contacts the shoulder 44 of each roller is also preferably crowned for a like purpose. The point of contact between the ring 43 and the shoulder 44 of each roller is preferably so positioned as to lie on a line $b$ which extends through the point of contact of each roller with the ring 40 and through the mesh point of the roller pinion 45 and gear 46. This line $b$ also extends through the point of intersection of the roller axis $a$ with the axis of rotation of the cage 20. With the parts thus corelated the rolling action between the roller section 39 and the ring 40 and between the pinion 45 and gear 46 are accurately coordinated in a manner to substantially eliminate sliding friction between the section 39 and ring 40, and also sliding friction between the ring 43 and shoulder 44 of each roller is reduced to a minimum.

In the transmission shown the ring 42 is supported and centered by the group of rollers 32 and is held against rotation by appropriate means such as a pin 42' fixed in the ring 42 and projecting radially therefrom through a cam slot 48 formed in an arm 49 rigidly supported by and projecting inwardly from the disk 25. The cam slot 48 is preferably straight and extends substantially paralled to the axis of rotation of the cage 20.

The pin 42' is loosely guided in the slot 48 and is movable lengthwise of the slot in a manner to shift the ring 42 along the tapered sections 41 of the rollers. It will of course be understood that with the ring 42 in the position shown in contact with each roller section 41 at a point in the line $b$, the rollers will planetate idly within the rings 40 and 42 and ring gear 46 without imparting rotation to the drum 19, but when the ring 42 is shifted from that position toward the broken line position of Fig. 1 the planetary action of the rollers will be so modified as to cause them to impart rotation to the ring 40 and ring gear 46 and thereby drive the drum 19 at a rate dependent upon the distance of the ring from the position first described.

Adjustment of the ring 42 along the roller sections 41 may be effected in various ways but the means shown for that purpose is quite satisfactory. It comprises a block 50 supported and actuated by a screw shaft 51 which extends horizontally across the housing 10 above the slotted arm 49. The shaft 51 extends through the block 50 and is in screw threaded engagement therewith. The shaft 51 is journalled at one end in a suitable bushing 52 seated in an appropriate supporting boss 53 formed at one side at the top of the housing 10, and is journalled adjacent its other end in a similar boss 54 at the other side of the housing top. A hand wheel 55 or other suitable actuator is fixed to the last mentioned end of the shaft 51, and a nut 56 coacts therewith to retain the shaft against lengthwise displacement.

The diameter of bushing 52 at one end of the shaft 51 is equal to the diameter of the other end of the shaft, and the bores in both supporting bosses 53 and 54 are of like diameter, so that the shaft 51 may be reversed to position the hand wheel 55 on the other side of the housing 10, whenever it is desirable to do so.

The pin 42' projects upwardly into a diagonal cam slot 57 formed in the horizontal bottom face of the block 50, so that as the block is shifted along the transverse shaft 51 the cam slot 57 reacts on the pin 42' to shift it along the cam slot 48 in the arm 49 and thereby shift the ring 42 along the rollers. Movement of the block 50 in one direction is limited by a stop screw 58 adjustably fixed in one side wall of the housing, and a similar stop 59 in the other wall of the housing limits movement of the block in the other direction, so that the range of movement of the ring 42 along the rollers is thus accurately limited and controlled.

The block 50 is shown disposed beneath an opening 60 in the top of the housing which is normally closed by a removable cover plate 61, the latter coacting with the top side of the block 50 to prevent rotation thereof about the axis of the screw. The cover plate 61 also provides support for an indicator in the form of a dial 62. The dial 62 is carried by a vertical stud 63 journalled in the center of the plate 61 and provided at its lower end with an actuating pinion 64. The top side of the block 50 is provided with a longitudinal channel 65 of a width to freely accommodate the pinion 64 and a rack 66 disposed within the channel 65, at one side thereof, meshes with the pinion 64 to actuate the pinion and consequently the dial 62 whenever the block 50 is actuated. A fixed pointer 67 on the plate 61 cooperates with the dial 62. It will thus be noted that the rotative position of the dial 62 corresponds at all times with the position of the block 50, and consequently with the position of the ring 42 along the rollers 32, and the dial may be graduated to directly indicate the rates of rotation of the driven shaft corresponding to the various positions to which the ring 42 may be shifted by manipulation of the screw actuator 55.

It will of course be understood that the effect of the regulating shaft 51 upon the change in output speed of the transmission is determined by the shape of the cam slots 48 and 57. When these cam slots are straight, as in Fig. 3, successive revolutions of the shaft 51 of course produce uniform movements of the control ring 42 throughout the range of movement of the ring, but in the transmission shown uniform adjustments of the ring 42 at different points in its range of movement produce non-uniform changes in the output speed of the transmission, so that at one point in the speed range a single revolution of the regulator shaft 51 will produce a speed change different from that produced at another point in the speed range.

Under some conditions of use it is desirable that the relation between regulator movements and resulting speed changes be maintained uniform throughout the speed range. Although this might be accomplished by modifying the shape of either or both of the cam slots 48 and 57, the straight form of slot 48 is preferably maintained and the other slot 57 is preferably curved to effect the desired result. By using a curved slot such as indicated at 57' in Fig. 4, successive revolutions of the regulator shaft 51 will produce uniform changes in the output speed of the transmission throughout the range of speed thereof.

Various changes may be made in the embodiment of the invention hereinabove specifically described without departing from or sacrificing the advantages of the invention as defined in the appended claims.

I claim:

1. In a variable speed transmission the combination of a plurality of inclined planet rollers revolvable about a central axis, two coaxial torque sustaining rings encircling said rollers, one of said rings being rotatable relative to the other, the center of gravity of each of said rollers being disposed between said rings so that said rollers are centrifugally urged against both of said rings in all relative positions of said rings and rollers, said rings coacting with said rollers to maintain the inclination of said rollers relative to said axis, each of said rollers having a longitudinally extended tapered section in contact with one of said rings, and means for effecting relative adjustment between said last mentioned ring and said sections in a direction lengthwise of said sections to vary the speed ratio of the transmission, the angle of taper of said sections being equal to the inclination of said rollers whereby the inclination of said rollers is not disturbed by said relative adjustment between said last mentioned ring and sections.

2. In a variable speed transmission the combination of a plurality of inclined planet rollers revolvable about a central axis, a driven ring encircling said rollers, a control ring encircling said rollers, each of said rollers having a longitudinally extended tapered section in contact with said control ring, the center of gravity of each of said rollers being disposed between said rings in all relative positions of said rings and rollers so that said rollers are centrifugally urged into pressure contact with both of said rings, said rings coacting with said rollers to maintain the inclination thereof relative to said axis, means for effecting relative adjustment between said control ring and the tapered sections of said rollers to vary the speed ratio of the transmission, the angle of taper of said tapered sections being substantially equal to the inclination of said rollers whereby said relative adjustment between said control ring and sections does not disturb the inclination of said rollers.

3. In a variable speed transmission the combination of a plurality of inclined planet rollers revolvable about a central axis, a driven ring encircling said rollers, each of said rollers having a section in frictional rolling engagement with said driven ring, a control ring, each of said rollers having a longitudinally extended tapered section in frictional rolling engagement with said control ring, the center of gravity of each of said rollers being disposed between said rings so that said rollers are centrifugally urged against both of said rings, a rotary carrier for said driven ring, intermeshing gears providing a positive torque transmitting relation between said rollers and said carrier, and means for effecting relative adjustment between said control ring and said tapered sections to vary the speed ratio of the transmission.

4. In a variable speed transmission the combination of a plurality of inclined planet rollers revolvable about a central axis, two torque sustaining rings encircling said rollers, each of said rollers having a section in frictional rolling engagement with one of said rings and a longitudinally extended tapered section in frictional rolling engagement with the other of said rings, the center of gravity of each of said rollers being disposed between said rings so that said rollers are centrifugally urged into pressure contact with both of said rings, means for effecting relative adjustment between said tapered sections and the ring with which they contact to vary the speed ratio of the transmission, a rotary carrier for the other of said rings and intermeshing gears providing positive driving connections between said rollers and said carrier.

5. In a variable speed transmission the combination of a plurality of inclined planet rollers revolvable about a central axis, three concentric rings coacting with said rollers to maintain the inclination of said rollers relative to said axis, means for preventing relative longitudinal displacement of said rollers relative to one of said rings, a rotary carrier for said last mentioned ring, intermeshing gears providing torque transmitting connections between said rollers and said carrier, means for effecting relative adjustment between said rollers and another of said rings to develop pressure contacts between said rollers and rings, and means for effecting relative adjustment between said rollers and the third of said rings to vary the speed ratio of the transmission.

6. In a variable speed transmission the combination of a plurality of inclined planet rollers each having a longitudinally extended tapered section, a control ring encircling and contacting said roller sections and movable lengthwise of said rollers, a member extending lengthwise of said rollers, means on said ring coacting with said member for retaining said ring against rotation in all positions of said ring, a cam member shiftable transversely of said first named member and operable on said last named means to shift said ring lengthwise of said roller sections, and an actuator for said cam member, said cam member being shaped to maintain a constant relation between the movement of said actuator and the resultant change in output speed through the output speed range of the transmission.

7. In a variable speed transmission the combination of a plurality of inclined planet rollers each having a longitudinally extended tapered section, a control ring encircling and contacting said roller sections and movable lengthwise thereof to vary the output speed of the transmission, means extending lengthwise of said rollers and reacting on said ring to retain the ring against rotation in all positions thereof, and a separate cam member movable to vary the position of said ring, said cam member having a cam surface curved to effect equal increments of change in output speed in response to equal increments of motion of said cam member.

ALFRED G. BADE.

REFERENCES CITED

The following references are of record in the file of this patent:

UNITED STATES PATENTS

| Number | Name | Date |
| --- | --- | --- |
| 966,046 | Noonan | Aug. 8, 1910 |
| 2,238,801 | Schmitter | Apr. 15, 1941 |
| 2,328,536 | Bade | Sept. 7, 1943 |
| 2,342,071 | Bade | Feb. 15, 1944 |

FOREIGN PATENTS

| Number | Country | Date |
| --- | --- | --- |
| 8,337 | Great Britain | Apr. 1, 1897 |